3,285,697
METHOD FOR MAKING SINGLE CRYSTAL GRAPHITE SHEETS

Pei-Ching Li, Burlington, Mass., assignor, by mesne assignments, to the United States of America as represented by the Secretary of the Navy
No Drawing. Filed Apr. 3, 1963, Ser. No. 270,479
2 Claims. (Cl. 23—209.3)

This invention relates to a process for producing single-crystal graphite sheets having improved thermal and electrical qualities.

The art of graphitizing carbon is not one of recent origin, nor is it by any means novel, but on the other hand, it is a process to which a great deal of importance attaches by virtue of the many improvements inherent in graphitized articles, as contrasted with similar ungraphitized carbonaceous forms. The prior art procedure for forming single-crystal graphite sheets was to envelop the inner graphitizing zone in a horizontal induction-heated furnace throughout the heating and cooling cycle with aluminum carbide. The aluminum carbide was ground to −325 mesh. A cylinder, approximately 4 cm. in diameter by 8 cm. long, was hydrostatically pressed at about 60,000 p.s.i. in a high pressure, oil-filled bomb. The fine particle size was necessary to give adequate strength to the pressed body. A 1 cm. hole was drilled axially through the cylinder. The cylinder was placed in a loose-fitting, graphite tube in a horizontal induction-heated furnace that was equipped with graphite radiation shields at either end. The charge was heated slowly so that it reached about 2400° C. in 4 hours. It was held at that temperature for an additional 2 hours, then slowly cooled by reducing the power to the induction coil. Purified argon was passed through the unit at atmospheric pressure at approximately 40 ml./minute throughout the entire heating cycle. The largest graphite crystals were found growing into the axial hole in the charge and into voids throughout the charge that had resulted from shrinkage or cracking during the heating period. One difficulty with the making of single crystal graphite sheets in this manner was that the graphite was contaminated with free aluminum and unreacted aluminum carbide impurities. Furthermore, because of the temperature gradients, the charge was seldom completely converted to graphite throughout. Since the decomposition of the aluminum carbide involves a vapor phase, the reaction was difficult to control with the result that aluminum carbide was everywhere in the furnace either blown about mechanically by the argon stream or formed by reaction of the vaporized aluminum with the carbon furnace parts. There was never complete assurance, therefore, that a large enough sample of graphite for analysis could be recovered without the possibility of mechanical inclusion of aluminum of aluminum carbide. Even after the graphite crystal was purified, it did not possess the high degree of electrical and thermal anisotropy associated with graphite.

With a view to departing from prior art techniques for producing single-crystal graphite sheets, the main object of this invention is to provide a novel method for producing an improved single crystal graphite sheet which possesses a high degree of electrical and thermal anisotropy, which exhibits exceptional stability under electron bombardment, which possesses a high degree of purity, and which is impermeable to fluids at high temperatures.

Other objects and many of the attendant advantages of this invention will be readily appreciated as the same becomes better understood by reference to the following detailed description.

It has been discovered that if a powdered boride is placed on the surface of a carbon article and the article is then heated to approximately 2500° C. in an induction furnace to graphitize the carbon, the boride will form a melt into which carbon from the carbon substrate may diffuse. The melt becomes super-saturated with carbon and, as the temperature is lowered, the carbon separates from the solution thereby forming a thin foil of graphite on the surface of the article. After cooling, this foil is peeled from the said surface thereby resulting in the provision of an extremely thin flexible sheet of single-crystal graphite having a bright and shiny surface.

Borides and free metals which have been found useful are titanium boride, zirconium boride, tungsten, nickel, chromium, rhenium, molybdenum and manganese.

A specific example of the practice of the invention follows:

Example I

The surface of a carbon crucible was covered with a layer of titanium boride powder and positioned inside of a horizontal induction-heated furnace that was equipped with graphite radiation shields at either end. The crucible was heated slowly to a maximum temperature of 2500° C. over a four hour period. This temperature was maintained for an additional two hours. The titanium boride formed a melt into which the graphitized carbon dissolved. As the temperature was slowly lowered by reducing the power to the induction coil, the carbon separated from the solution and formed a single-crystal sheet of graphite on the surface of the crucible. Purified hydrogen was passed through the unit at a pressure below 40 mm. of mercury at approximately 40 ml./minute throughout the entire heating cycle. After cooling, the single-crystal sheet, ranging in size from ½ to 1 cm. square, was peeled from the crucible. Besides hydrogen other gases, for example argon, helium, neon, xenon, and krypton can be used in the method of the invention. It is necessary only that the gas employed be incapable of reacting with carbon or graphite at the temperatures and pressures involved in the method of the invention to an extent that would prohibit the formation of a pyrographite. Similarly, heating can be achieved in any of various ways, such as heating by radiation, induction heating, or resistance heating.

The sheets made in accordance with this invention are very thin, flat, and smooth thereby making them suitable for use as substrates for high resolution shadow-casting. These single-crystal sheets also exhibit execeptional stability under electron bombardment because of their low thermal expansion coefficient and of their high heat resistance. By virtue of their high degree of thermal and electrical anisotropy, the graphite single-crystal sheets are particularly suitable for low temperature electron microscopy applications since they provide favorable conditions for heat transfer and protection of appropriately oriented specimens.

Obviously many modifications and variations of the present invention are possible in the light of the above teachings. It is therefore to be understood that within the scope of the appended claims the invention may be practiced otherwise than as specifically described herein.

What is claimed is:

1. A process for producing an improved single crystal pyrolytic graphite sheet comprising:

(a) covering the surface of a carbon article with a layer of powdered titanium boride;
   (b) placing the said carbon article in an induction furnace;
   (c) heating the carbon article to a maximum temperature of 2500° C. in an inert gaseous atmosphere while maintaining the pressure inside the furnace below 40 mm. of mercury to effect the dissolving of the carbon into the titanium boride layer wherein the said titanium boride becomes super-saturated with carbon;

(d) lowering the temperature of the titanium boride-carbon solution whereby the carbon separates from the said solution to form a single-crystal sheet of pyrolytic graphite on the titanium boride layer.

2. A process according to claim 1 further including the step of separating the single-crystal sheet of pyrolytic graphite from the layer of titanium boride which covers the surface of the carbon article.

References Cited by the Examiner

UNITED STATES PATENTS

| | | | |
|---|---|---|---|
| 2,900,281 | 8/1959 | Grams | 117—226 X |
| 3,138,435 | 6/1964 | Diefendorf | 23—209.1 |
| 3,167,393 | 1/1965 | Giardini et al. | 23—209.1 |

OSCAR R. VERTIZ, *Primary Examiner.*

E. J. MEROS, *Assistant Examiner.*